(12) United States Patent
Troy et al.

(10) Patent No.: US 9,740,191 B2
(45) Date of Patent: Aug. 22, 2017

(54) LOCATION CALIBRATION FOR AUTOMATED PRODUCTION MANUFACTURING

(71) Applicant: The Boeing Company, Chicago, IL (US)

(72) Inventors: James J. Troy, Issaquah, WA (US); Barry A. Fetzer, Renton, WA (US); Scott W. Lea, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 14/620,588

(22) Filed: Feb. 12, 2015

(65) Prior Publication Data

US 2016/0239013 A1    Aug. 18, 2016

(51) Int. Cl.
| | | |
|---|---|---|
| *G05B 19/402* | (2006.01) | |
| *G05B 15/02* | (2006.01) | |
| *B25J 9/16* | (2006.01) | |

(52) U.S. Cl.
CPC ......... *G05B 19/402* (2013.01); *B25J 9/1607* (2013.01); *B25J 9/1664* (2013.01); *B25J 9/1692* (2013.01); *B25J 9/1697* (2013.01); *G05B 15/02* (2013.01); *G05B 2219/31076* (2013.01); *Y10S 901/09* (2013.01)

(58) Field of Classification Search
CPC ............... G05B 19/402; G05B 19/404; G05B 19/41805; G05B 19/41815; G05B 19/18; G05B 19/19; G05B 2219/31068; G05B 2219/31076; G05B 15/02; B25J 9/162; B25J 9/1607; B25J 9/1664; B25J 9/1692; B25J 9/1697
See application file for complete search history.

(56) References Cited

U.S. PATENT DOCUMENTS

| | | | |
|---|---|---|---|
| 7,643,893 B2 | 1/2010 | Troy et al. | |
| 7,813,830 B2 | 10/2010 | Summers et al. | |
| 7,859,655 B2 | 12/2010 | Troy et al. | |
| 8,199,194 B2 | 6/2012 | Troy et al. | |

(Continued)

OTHER PUBLICATIONS

U.S. Appl. No. 14/222,368, "Relative Object Localization Process for Local Positioning System", filed Mar. 21, 2014.

*Primary Examiner* — Dennis M Butler
(74) *Attorney, Agent, or Firm* — Ostranger Chong Flaherty & Broitman P.C.

(57) ABSTRACT

Systems and methods for calibrating the location of an end effector-carrying apparatus relative to successive workpieces before the start of a production manufacturing operation. The location calibration is performed using a positioning system. These disclosed methodologies allow an operator to program (or teach) the robot motion path once and reuse that path for subsequent structures by using relative location feedback from a measurement system to adjust the position and orientation offset of the robot relative to the workpiece. When each subsequent workpiece comes into the robotic workcell, its location (i.e., position and orientation) relative to the robot may be different than the first workpiece that was used when developing the initial program. The disclosed systems and methods can also be used to compensate for structural differences between workpieces intended to have identical structures.

20 Claims, 9 Drawing Sheets

(56) References Cited

U.S. PATENT DOCUMENTS

| | | | |
|---|---|---|---|
| 8,447,805 B2 | 5/2013 | Troy et al. | |
| 2009/0240372 A1* | 9/2009 | Bordyn | B25J 9/1692 700/259 |
| 2010/0010660 A1* | 1/2010 | Salour | G05B 19/402 700/117 |
| 2011/0149266 A1* | 6/2011 | Motzer | G01S 5/16 356/4.01 |
| 2012/0327187 A1 | 12/2012 | Troy et al. | |
| 2014/0376768 A1 | 12/2014 | Troy et al. | |

* cited by examiner

LOCATION CALIBRATION FOR AUTOMATED PRODUCTION MANUFACTURING

BACKGROUND

This disclosure generally relates to systems and methods for calibrating the location of a workpiece or part relative to a coordinate system of a robot or other electro-mechanical machine that is guided by a computer program.

It is known to use robots (e.g., platform- and rail-mounted articulated arms, crawling vehicles, etc.) to automate composite non-destructive inspection (NDI) and assembly (e.g., drilling, trimming, bonding, fastening, painting, etc.) processes. These robotic methods have the potential to significantly reduce the times and costs of the various processes. Typically the robot comprises a base, a robotic arm, and interchangeable end effectors attachable to a distal end of the robotic arm. Depending on the automated function being performed, the end effector may comprise a non-destructive inspection sensor or sensor array or some other tool.

The production manufacturing of a large composite structure for an active airplane program needs to be done at a rate that meets schedule commitments. For example, it is known to fabricate fuselage sections made of composite material on an assembly line with high through-put. The finished fuselage sections need to undergo NDI at a high rate. In addition, high-speed NDI of stiffeners on the inside of many composite airplane fuselage or other stiffened sections is desirable in order to maintain the manufacturing rate.

The end effector of a computer-controlled machine must travel along a correct motion path when performing an operation on a workpiece. However, the correct motion path is a function of the location of the workpiece relative to the computer-controlled machine. For example, as successive workpieces are positioned and oriented at a NDI work station, the positions and orientations may vary from one workpiece to the next. To compensate for variations in position in orientation of the workpiece, the computer controlling the NDI sensor-carrying robot must be programmed with new motion paths for use in inspecting each new workpiece.

In a known NDI operation, robots holding ultrasonic arrays are in place to scan and inspect the Outer Mold Line (OML) and Inner Mold Line (IML) of the workpiece. In the case of a half-barrel fuselage section, the skin OML is inspected using one or more robots mounted outside, and stiffeners attached to the IML of the half-barrel fuselage section are inspected using one or more robots mounted inside. These robots can be on pedestals, permanent tracks, or have mobile bases.

Both the OML skin and the stiffeners on the IML must be inspected. The inspection robots must be oriented relative to the workpiece coordinate system for both. Robot motion control sequences are developed for the OML and IML inspections based on the location of the robot base relative to the half-barrel fuselage section, and it would be more cost effective if the motion sequences did not have to be re-programmed each time a new half-barrel fuselage section (of the same design) was moved into the workcell.

One challenge is that the location of the half-barrel fuselage section relative to the robot base is not accurately known, since in this configuration the location of the support fixturing relative to the robot base may vary from one half-barrel fuselage section to the next. Another challenge is that the three-dimensional (3-D) coordinates of the features of an unfinished half-barrel fuselage section (prior to installation of further supporting structure) may be either unavailable or variable as it is held in the support fixturing. These issues make it difficult to use existing measurement techniques to accurately determine the change in relative robot base position and the changes of specific feature locations between subsequent half-barrel fuselage sections.

SUMMARY

The subject matter disclosed in detail below is directed to calibrating the location of an end effector-carrying apparatus relative to successive workpieces before the start of a production manufacturing operation. The location calibration is performed using a positioning system. One type of positioning system which is suitable accomplishing location calibration is a local positioning system (LPS).

Systems and methods are disclosed below which solve the problem of programming new motion paths for a robot for each new workpiece. The methodologies disclosed herein allow an operator to program (or teach) the robot motion path once and reuse that path for subsequent structures by using relative location feedback from a measurement system to adjust the position and orientation offset of the robot relative to the workpiece. This is important because when each subsequent workpiece comes into the robotic workcell, its location (i.e., position and orientation) relative to the robot may be different than the first workpiece that was used when developing the initial program.

The systems and methods disclosed below can also be used to compensate for structural differences between workpieces intended to have identical structures. For example, the structure of a second workpiece may vary slightly in shape relative to the structure of the first (i.e., original) workpiece that was used when initially programming the robot motion path, and by using measurement data features of the workpiece, sub-tasks within the motion program can be modified.

The process disclosed herein enables the re-use of pre-programmed motion paths. This can be the overall motion part, or portions of the motion path. The process works with rigid, as well as deformable objects. The process also addresses the potential differences between the coordinate system of the part and the coordinate system used when programming the robot (i.e., the workcell reference frame). (As used herein, the terms "coordinate system", "reference frame", and "frame of reference" are synonyms.) The robot controller can be effectively re-programmed through the use of a "robot base offset" definition (matrix), which allows the modification of the full scan path program. The robot controller API also allows external variables to be read, which is how the sub-programs are modified.

One aspect of the subject matter disclosed in detail below is a method for performing an automated function on successive workpieces comprising: (a) placing a first workpiece in a workcell at a first location while a robot base of a robot is situated at a second location; (b) placing a positioning system at a third location so that a laser and a camera of the positioning system have non-occluded views of a plurality of target markers on the first workpiece and a plurality of target markers on the robot base; (c) using the positioning system to separately measure respective positions of the target markers on the first workpiece and the target markers on the robot base; (d) calculating a first offset of the first workpiece at the first location relative to the robot base at the second location based on position information acquired in process (c); (e) creating a motion plan program for moving an end effector of the robot along a first motion path, the motion plan program being based at least in part on the first offset; (f) loading the motion plan program into a robot controller of the robot; (g) controlling the robot so that the end effector moves along the first motion path while the first workpiece is situated at the first location and performs an automated function on the first workpiece while the end effector is at a specified location along the first motion path; (h) removing the first workpiece from the workcell after process (g); (i) placing a second workpiece at a fourth location in the workcell after the first workpiece has been removed and while the robot base is situated at a fifth location in the workcell; (j) placing the positioning system at a sixth location so that the laser and the camera of the positioning system have non-occluded views of a plurality of target markers on the second workpiece and the plurality of target markers on the robot base, wherein the sixth location may be the same or different than the third location; (k) using the positioning system to separately measure respective positions of a plurality of target markers on the second workpiece and the plurality of target markers on the robot base; (l) calculating a second offset of the second workpiece at the fourth location relative to the robot base at the fifth location based on position information acquired in process (k); (m) modifying the motion plan program for moving the end effector of the robot along a second motion path different than the first motion path based at least in part on a difference between the first and second offsets; and (n) controlling the robot so that the end effector moves along the second motion path while the second workpiece is situated at the fourth location and performs an automated function on the second workpiece while the end effector is at a specified location along the second motion path.

In accordance with some embodiments of the foregoing method, the modification to the motion plan program compensates for a difference in a location of an origin of a coordinate system of the workcell as defined with reference to a coordinate system of the positioning system and the location of the origin of the coordinate system of the workcell as defined with reference to a coordinate system of the robot base.

Another aspect of the subject matter disclosed in detail below is a method for performing an automated function on a workpiece comprising: (a) loading a motion plan program into a robot controller of a robot, the motion plan program being written to control the robot so that an end effector of the robot will: (i) move along a first motion path while a first workpiece is situated at a first location in a workcell and a robot base of the robot is situated at a second location such that the first workpiece has a first offset relative to the robot base; and (ii) perform an automated function on the first workpiece while the end effector is at a specified location along the first motion path; (b) placing a second workpiece in the workcell at a third location while the robot base of the robot is situated at a fourth location; (c) placing a positioning system at a fifth location so that a laser and a camera of the positioning system have non-occluded views of a plurality of target markers on the second workpiece and a plurality of target markers on the robot base; (d) using the positioning system to separately measure respective positions of the plurality of target markers on the second workpiece and the plurality of target markers on the robot base; (e) calculating a second offset of the second workpiece at the third location relative to the robot base at the fourth location based on position information acquired in process (d); (f) modifying the motion plan program for moving the end effector of the robot along a second motion path different than the first motion path based at least in part on a difference between the first and second offsets; and (g) controlling the robot so that the end effector moves along the second motion path while the second workpiece is situated at the third location and performs an automated function on the second workpiece while the end effector is at a specified location along the second motion path.

A further aspect is a method for performing an automated function on a stiffener of a workpiece comprising: (a) placing a workpiece having a stiffener in a workcell at a first location while a robot base of a robot is situated at a second location; (b) loading a motion plan program into a robot controller of the robot, the motion plan program being written to control the robot so that an end effector of the robot will: (i) move along a first motion path that is based on an expected position in a coordinate system of the workcell of a point on a stiffener of a workpiece having a structure similar to the workpiece at the first location; and (ii) perform an automated function on the stiffener while the end effector is at a specified location along the first motion path; (c) placing a positioning system at a third location so that a laser and a camera of the positioning system have non-occluded views of a plurality of target markers on the workpiece, a plurality of target markers on the robot base, and a target marker at the point on the stiffener; (d) using the positioning system to separately measure respective positions of the plurality of target markers on the workpiece, the plurality of target markers on the robot base, and the target marker at the point on the stiffener; (e) calculating an offset of a position of the point on the stiffener of the workpiece at the first location relative to the expected position based on position information acquired in process (d); (f) modifying the motion plan program for moving the end effector of the robot along a second motion path different than the first motion path based at least in part on the calculated offset; and (g) controlling the robot so that the end effector moves along the second motion path and performs an automated function on the workpiece while the end effector is at a specified location along the second motion path.

Yet another aspect of the disclosed subject matter is a method for performing an automated function on stiffeners of a workpiece as described in the remainder of this paragraph with reference to first, second and third stiffeners of a plurality of stiffeners. It should be understood, however, that the automated function may be performed on all of the plurality of stiffeners of the workpieces and the method may be applied to any trio of adjacent stringers. The method comprises: (a) placing a workpiece having at least first, second and third stiffeners in a workcell at a first location while a robot base of a robot is situated at a second location, the second stiffener being between the first and third stiffeners; (b) loading a motion plan program into a robot controller of the robot, the motion plan program being written to control the robot so that an end effector of the robot will: (i) move along a first motion path adjacent to the first stiffener of the workpiece that is based on an expected position in a coordinate system of the workcell of a point on the first stiffener; and (ii) perform an automated function on the first stiffener while the end effector is at a specified location along the first motion path; (c) placing a positioning system at a third location so that a laser and a camera of the positioning system have non-occluded views of respective target markers at respective points on the first, second and third stiffeners of the workpiece; (d) using the positioning system to measure a position of the target marker on the second stiffener; (e) calculating an offset of the position of the point on the second stiffener relative to the expected position of the point on the first stiffener based on position information acquired in process (d); (f) modifying the motion plan program for moving the end effector of the robot along a second motion path adjacent the second stiffener based at least in part on the calculated offset; and (g) controlling the robot so that the end effector moves along the second motion path and performs an automated function on the second stiffener while the end effector is at a specified location along the second motion path. This method may further comprise: using the positioning system to measure respective positions of the target markers on the first and third stiffeners; and determining a direction of a vector normal to the surface of the stiffener at the target marker position on the second stiffener based on the measured respective positions of the target markers on the first and third stiffeners.

In general, the locations of adjacent stiffeners can be used to compute an approximation of the surface normal for a specific stringer. One way to compute an approximation of the stiffener normals in a general way is the following vector equation:

$$N(i)=f(P(i-1),P(i+1))$$

which shows that the approximation for N(i) is a function of the positions of points on the adjacent stiffeners, with N(i) being the normal of the i-th stringer, and the subscript indices (i−1) and (i+1) representing the sequence index numbers of the stiffeners adjacent to stiffener i.

Other aspects of systems and methods for calibrating the location of an end effector-carrying apparatus relative to workpieces placed in a workcell for performing an automated function are disclosed in detail below.

BRIEF DESCRIPTION OF THE DRAWINGS

Drawings representing views of physical structures (e.g., see FIGS. 1-3) are not drawn to scale. Also, it should be noted that the drawings representing physical structures do not show the flexible cable which connects electrical components of the end effector to a computer system (also not shown) that controls an automated function and, in the case of ultrasonic inspection, do not show the flexible cable which connects the end effector (in this case, an ultrasonic transducer inspection unit) to a source of acoustic couplant (also not shown).

Reference will hereinafter be made to the drawings in which similar elements in different drawings bear the same reference numerals.

DETAILED DESCRIPTION

The processes described in detail below use a relative measurement process to provide current offset data to the robot controller which allows the latter to use an existing robot motion sequence. In this way, the operator only needs to program the robot controller once for each workpiece, and the measurement system will provide the robot application with the offsets necessary to modify the existing robot motion for the current location of the workpiece relative to the workcell coordinate system defined inside the robot controller.

For the purpose of illustration, location calibration for robotic non-destructive inspection of a half-barrel fuselage section made of composite material will be described. However, it should be appreciated that the calibration processes disclosed are equally applicable when other automated functions are to be performed on other types of structures. As used herein, the term "production manufacturing" includes, but is not limited to, operations such as nondestructive inspection (NDI), drilling, scarfing, grinding (e.g., to remove bonded or bolted components), fastening, appliqué application, ply mapping, stripping, cleaning, and painting. Any one of a multiplicity of end effectors for performing a respective one of the foregoing functions can be attached to a computer-controlled apparatus, such as the articulated arm of a robot.

Other types of structures to which the calibration processes disclosed hereinafter can be applied include structures in the form of curved cylinder-like workpieces, such as half- or full-barrel-shaped sections of an aircraft fuselage. The calibration processes disclosed herein may also be used in connection with structures having geometries which are not curved and cylinder-like.

Figure 1:
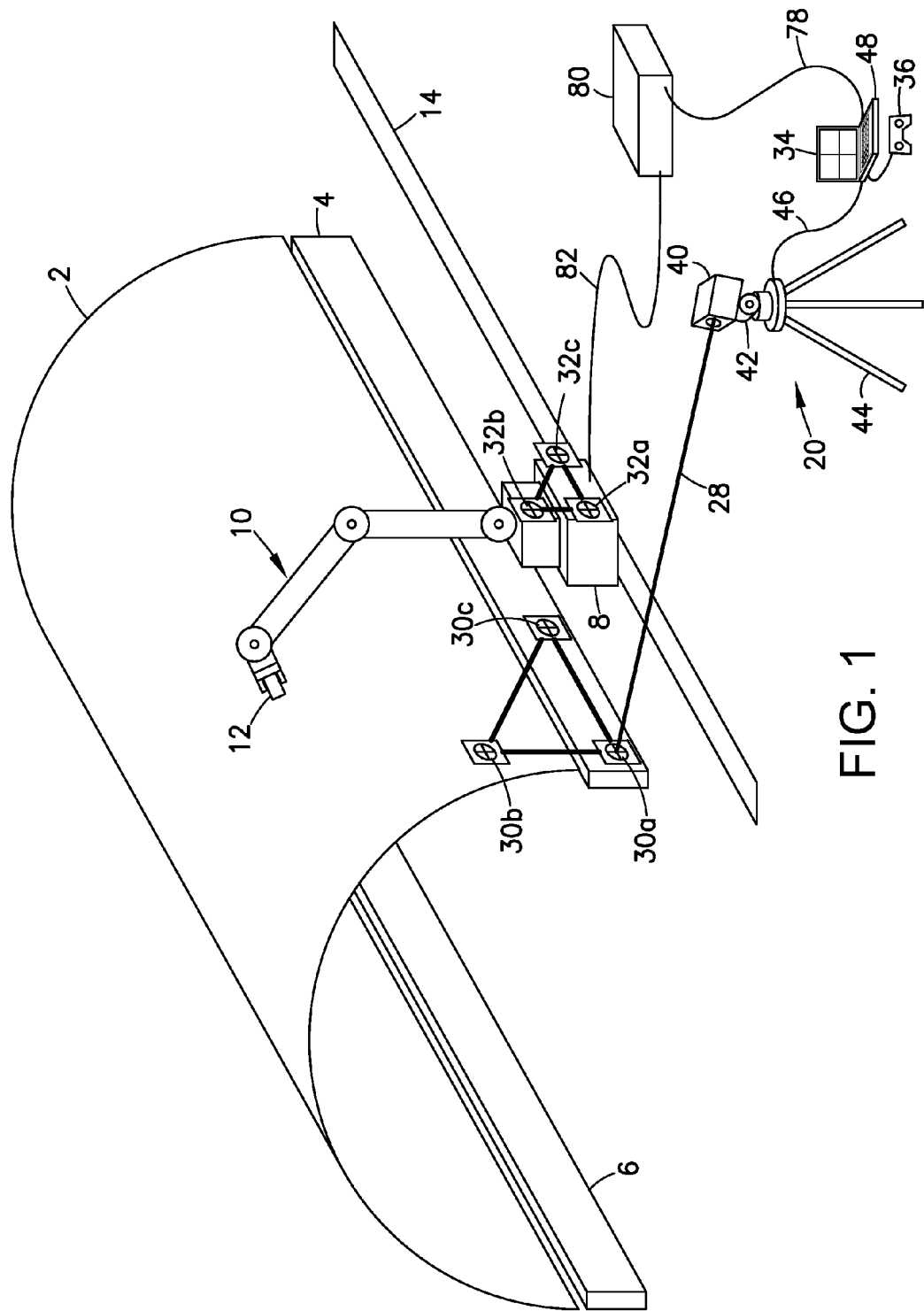
FIG. 1 is a diagram representing an isometric view of components of a system for performing a process for calibrating the location of a half-barrel fuselage section relative to a robot base of an external robot using a LPS in accordance with one embodiment. The robot depicted in FIG. 1 may be designed and programmed to perform non-destructive inspection of the outer mold line (OML) of the half-barrel fuselage section.

FIG. 1 is an isometric view of components of a system having automated apparatus for performing non-destructive inspection and means for calibrating the location of a workpiece relative to the automated apparatus in accordance with one embodiment. In the embodiment depicted in FIG. 1, the automated apparatus is an external robot 10; the workpiece is a half-barrel fuselage section 2; and the means for calibrating is a LPS 20. The robot 10 comprises a robot base 8 that is translatable along a track 14 and an end effector 12 attached to a distal end of the articulated arm of the robot. The side edges of the half-barrel fuselage section 2 are supported by left and right support fixtures 4 and 6 respectively. Although support fixtures 4 and 6 are depicted as fixed structures, in the alternative the half-barrel fuselage section 2 may be transported into position for inspection by means of automated guided vehicles or other transport devices, with the understanding that the half-barrel fuselage section is stationary during the automated inspection operation.

In particular, the robot 10 depicted in FIG. 1 may be designed and programmed to perform non-destructive inspection of the outer mold line (OML) of the half-barrel fuselage section, in which case the end effector 12 may comprise a non-destructive inspection sensor or sensor array. (The same external scanning system can be adapted to inspect respective halves of the OML of a full-barrel fuselage section.) During ultrasonic inspection, the end effector 12 is scanned across the OML of the half-barrel fuselage section 2. The end effector 12 may take the form of multiple ultrasonic transducer elements lined up in an array and contained in a structure called a shoe to provide for a wide scan. During each scan, the end effector 12 acquires a respective swath of ultrasound scan data. Successive swaths of ultrasound scan data may be acquired from successive contiguous segments of the half-barrel fuselage section 2 to provide full scan coverage from one end of the half-barrel fuselage section 2 to the other end.

As shown in FIG. 1, the LPS 20 in accordance with one embodiment comprises a video camera 40 and a laser range meter (not shown) on a controllable pan-tilt mechanism 42 mounted on a tripod 44. The video camera 40 and pan-tilt mechanism 42 are operated by an LPS computer 48. The LPS computer 48 communicates with the video camera 40, laser range meter, and the pan-tilt mechanism 42 through a video/control cable 46. The pan and tilt angles of the pan-tilt mechanism 42 and, therefore, the orientation of the video camera 40 can be controlled using the keyboard of the computer or some other input device, such as the gamepad interface 36 shown in FIG. 1. The optical image field, with crosshair overlay, as sighted by the video camera 40, can be displayed on the monitor 34 of the computer 48.

The LPS 20 seen in FIG. 1 can be used to determine the offset of the half-barrel fuselage section 2 relative to the robot base 8. The robot controller 80 controls the robot 10, the location of the robot base 8 along the track 14, and the location of the end effector 12 in a workcell frame of reference. The LPS computer 48 communicates with the robot controller 80 through an electrical cable 78. The robot controller 80 is preferably a computer programmed with motion control software for controlling the motion of the end effector 12 relative to the half-barrel fuselage section 2. The motion control commands are sent to a processor (not shown) inside the robot base 8 via an electrical cable 82. Alternatively, wireless communication can be employed.

The location offset between robot base 8 and half-barrel fuselage section 2 (i.e., the location of the coordinate system of the half-barrel fuselage section 2 relative to the coordinate system of the robot 10) can be determined in a well-known manner. First, the LPS computer 48 determines the X, Y, Z values for measured passive target markers 30a-30c placed on the half-barrel fuselage section 2 and the X, Y, Z values for measured passive target markers 32a-32c placed on the robot base 8 when robot base 8 and half-barrel fuselage section 2 are at their respective initial locations. This is accomplished by aiming a laser beam 28 at each passive target marker in succession while the LPS 20 is in the same location, and recording the distance, pan, and tilt values for each point, and then computing the corresponding X, Y, Z values in the target coordinate system. The LPS computer 48 then uses a relative localization process to produce data representing the location of the half-barrel fuselage section 2 relative to the robot base 8. This methodology can be used at the start of each work sequence to establish the relative locations of the robot base 8 and the particular half-barrel fuselage section 2 to be inspected.

Commercial robotics applications used for production tasks have a process to define the location of the robot base 8 and other parts relative to the origin of the workcell frame of reference (i.e., workcell coordinate system). This will include both position and orientation offset definitions. There are many equivalent ways to define this offset information, such as: 4×4 transformation matrices, quaternions and translation, angle-axis and translation, or Euler angles and translation. The localization process described herein can be modified to output information in whatever format is acceptable to the robot controller 80.

There are several options that may be used to transfer the data from the computer 48 to the robot controller 80; some controllers may have an application programming interface (API) that accepts incoming data over a network socket or through a serial interface; other controllers may only allow offset data to be read from a file. Accordingly, in accordance with some embodiments, a file sharing approach can be used.

A methodology will now be described that allows an operator to program (or teach) the robot motion path once and reuse that path for subsequent half-barrel fuselage sections by using relative location feedback from the LPS to adjust the location (i.e., position and orientation) offset of the robot base 8 relative to each successive half-barrel fuselage section 2. This is important because when each subsequent half-barrel fuselage section 2 is placed in the workcell, its location (position and orientation) relative to the robot base 8 may be different than the first half-barrel fuselage section 2 that was used when developing the initial scan path program.

In accordance with one embodiment, the process for composite half-barrel fuselage section alignment for NDI comprises the following steps:

(1) A respective set of three passive target markers 32a-32c, that will be used by the LPS 20 for location calibration, are rigidly mounted to each robot base 8 (there may be multiple robots that operate concurrently or sequentially). The passive target markers 32a-32c are spaced apart in a non-collinear manner, with passive target markers 32a and 32c defining an x-axis and passive target markers 32a and 32b defining a z-axis of the coordinate system of the robot 10, or at known offsets to the origin of the robot coordinate system.

(2) A respective set of three passive target markers 30a-30c are pre-mounted on each half-barrel fuselage section 2 to be inspected. The passive target markers 30a-30c are spaced apart in a non-collinear manner, with passive target markers 30a and 30c defining an x-axis and passive target markers 30a and 30b defining a z-axis of the coordinate system of half-barrel fuselage section 2.

(3) The robot base 8 is then moved to a starting location within the inspection space (i.e., referred to herein as a "workcell").

(4) A first half-barrel fuselage section 2 is then moved into the workcell and generally located within the range of the robot's reach.

(5) The LPS 20 is then used to locate each of the three passive target markers 30a-30c pre-mounted on the first half-barrel fuselage section 2. This can be done by an operator using the LPS gamepad 36 to control the LPS 20 or automatically. (In alternative embodiments that employ active target markers (such as LED lights), the markers can be located using the point targeting method disclosed in U.S. patent application Ser. No. 13/921,246, the disclosure of which is incorporated by reference herein in its entirety.)

(6) The same locating operation is performed for the passive target markers 32a-32c mounted on the robot base 8 while the latter is at its starting location.

(7) A first offset of the first half-barrel fuselage section 2 relative to the robot base 8 is then calculated based on the position information acquired in steps (5) and (6). The first offset represents the difference between the location of the first half-barrel fuselage section 2 and the location of the robot base 8.

(8) A motion plan (relative to the workcell coordinate system) for the robot 10 is created based on the respective starting locations of the robot base 8 and the half-barrel fuselage section 2 and then converted into a suitable robot motion plan program. The motion plan may be created by any known programming methods, including: on-line methods, such as using a teach pendent; or off-line methods, such as 3-D simulation. This motion plan will control the position of the robot base 8, the rotations of the links of the articulated arm, the rotation of the end effector relative to the distal end of the articulated arm, extension of any telescopic link, etc.

(9) This motion plan program is loaded into the robot controller 80.

(10) The robot 10 is then activated to execute the pre-programmed motion plan.

(11) Upon completion of the non-destructive inspection of the first half-barrel fuselage section 2, the first half-barrel fuselage section 2 is removed from the workcell.

(12) The robot base 8 is then returned to its approximate starting position and a second half-barrel fuselage section 2 is moved into the workcell and generally located within the range of the robot's reach.

(13) The LPS (which may or may not have been moved) then locates each of the three passive target markers 30a-30c pre-mounted on the second half-barrel fuselage section 2.

(14) The same locating operation is performed again for the passive target markers 32a-32c mounted on the robot base 8.

(15) The LPS software then calculates a second offset of the second half-barrel fuselage section 2 relative to the robot base 8 based on the position information acquired in steps (13) and (14). The second offset represents the difference between the location of the first half-barrel fuselage section 2 and the location of the robot base 8. The LPS software also determines the required robot base offset adjustment to achieve the correct motion path for the robot 10 in this workcell and sends the robot base offset adjustment to the robot controller 80.

(16) The positional/orientational information in the robot base offset is used to transform (i.e., adjust) the pre-programmed motion plan of the robot 10 so that the end effector 12 will follow a corrected path relative to the second half-barrel fuselage section 2.

For one embodiment of the robot base offset method, the process determines the difference in location of the second half-barrel fuselage section relative to the location of the first half-barrel fuselage section and represents this difference defined in the reference frame of the first half-barrel fuselage section. This location difference (i.e., referred to herein as the "robot base offset adjustment") is sent from the LPS control computer 48 to the robot controller 80 through a data transfer connection, such as a serial connection (RS-232) in terms of the X, Y, and Z position changes as well as orientation changes, such as yaw, pitch, and roll angles. The robot controller 80 uses the position and orientation data (e.g. X, Y, Z, roll, pitch, and yaw) to internally construct a 4×4 homogeneous transformation matrix representing the robot base offset adjustment and then apply that transformation matrix to its existing robot base offset matrix.

Figure 2:
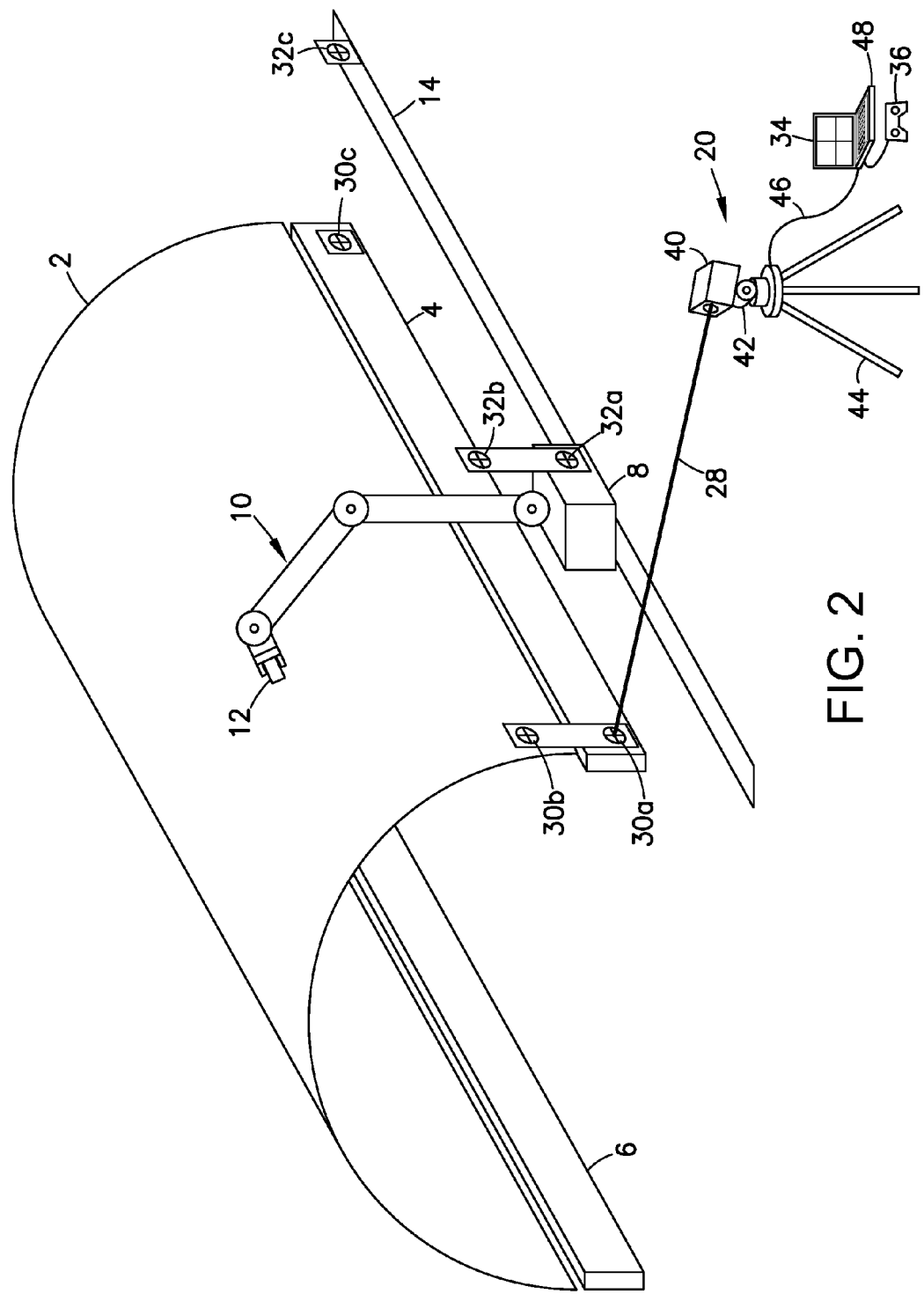
FIG. 2 is a diagram representing an isometric view of components of a system for performing the same calibration process in accordance with an alternative embodiment. The system depicted in FIG. 2 differs from the system depicted in FIG. 1 in that the passive target markers are spaced further apart from each other in order to provide better angular resolution.

FIG. 2 is a diagram representing an isometric view of components of a system for performing the same calibration process in accordance with an alternative embodiment. The system depicted in FIG. 2 differs from the system depicted in FIG. 1 in that the passive target markers 30a-30c mounted on the half-barrel fuselage section 2 are spaced further apart from each other and the passive target markers 32a-32c mounted on the robot base 8 are spaced further apart from each other in order to provide better angular resolution. Although not shown in FIG. 2, the system includes a robot controller connected as shown in FIG. 1.

Figure 3:
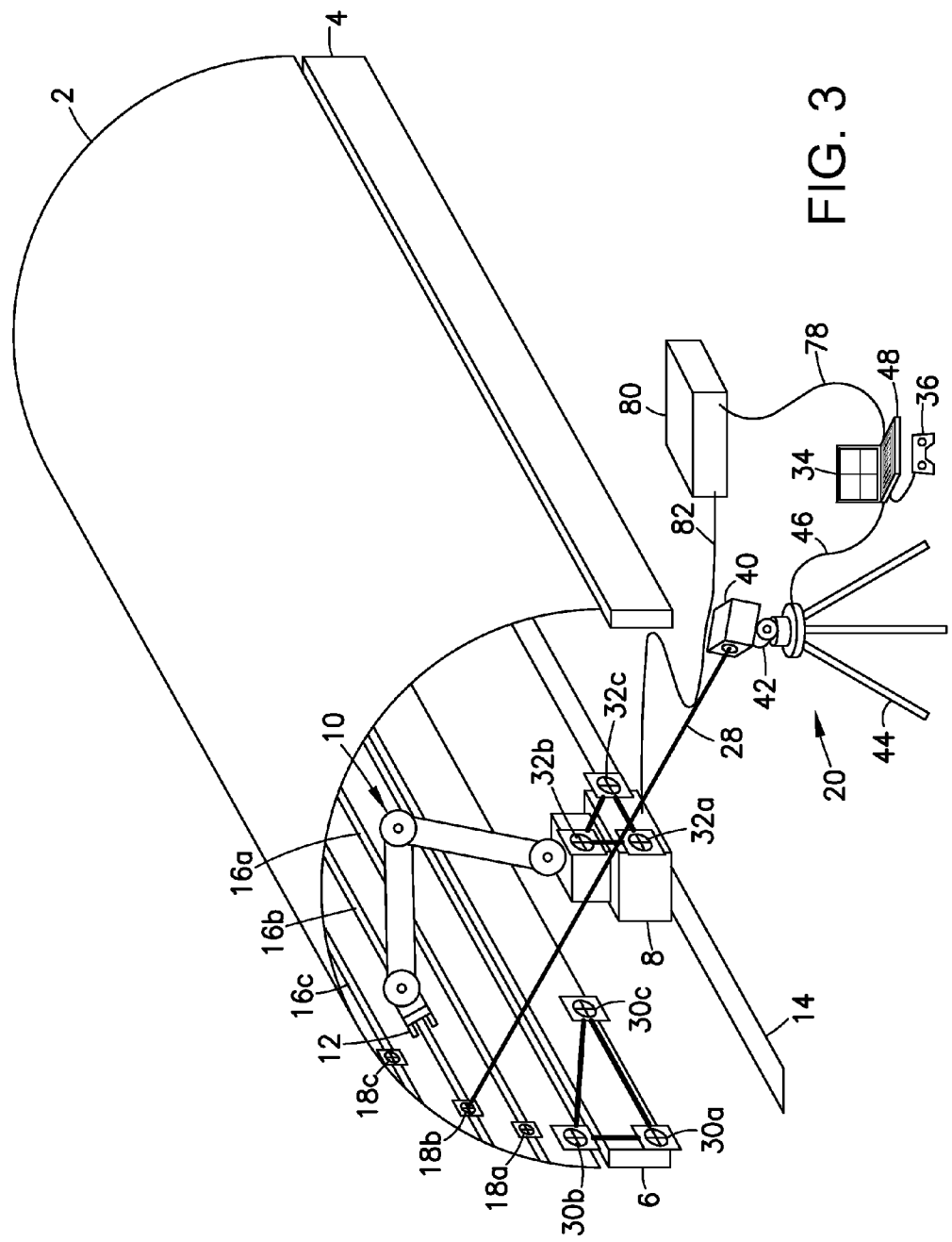
FIG. 3 is a diagram representing an isometric view of components of a system for performing a process for calibrating the location of a half-barrel fuselage section relative to a robot base of an internal robot and stiffener offset measurement using a LPS in accordance with a further embodiment. The robot may be designed and programmed to perform non-destructive inspection of the stiffeners of a half-barrel fuselage section.

In accordance with a further aspect, specific features on a half-barrel fuselage section—such as the IML stiffeners—can also be located for scanning as well. FIG. 3 is a diagram representing an isometric view of components of a system for performing a process for calibrating the location of a half-barrel fuselage section 2 relative to a robot base 8 of a robot 10 located in the interior region of the half-barrel fuselage section and further performing stiffener offset measurement using a LPS 20 in accordance with a further embodiment. The robot 10 may be designed and pro-grammed to perform non-destructive inspection of stiffeners 16a-16c and other stiffeners not visible in FIG. 3 (see stiffeners 16a-16m in FIG. 6) of a half-barrel fuselage section 2. In this inspection scenario, the program controlling robot 10 needs to be given the precise position of the start of the stiffener it is going to scan, as well as the stiffener's orientation. If the shaped of the half-barrel containing stiffener being inspected is warped as compared to the original half-barrel used during initial programming, the feature points may not be in the same place. A process similar to the one disclosed above can be used to adjust a sub-section of the robot motion control program based on measurement information about the specific features on the stiffener to be inspected relative to those same features on the original stiffener.

For one embodiment of this feature correction method, the process determines the change in position of the points on the ends of the stiffeners on the second half-barrel fuselage section relative to the corresponding points on the ends of the stiffeners on the first half-barrel fuselage section. These changes are defined in the reference frame of the first half-barrel fuselage section. As with the robot base offset correction process, this location difference data is sent from the LPS control program to the robot controller 80 over a communication connection, such as a serial connection (RS-232) in terms of X, Y, and Z position changes for each stiffener point, with all stiffener data concatenated into a single packet.

To accomplish the foregoing, each stiffener may have a passive target marker attached at or near one end or both ends. In the example depicted in FIG. 3, the stiffeners 16a-16c have respective passive target markers 18a-18c attached near respective ends of the stiffeners. The position offset between the robot base 8 and the end of any stiffener can be determined in a well-known manner. First, the LPS computer 48 determines the X, Y, Z values (defined in the coordinate system of the barrel) for measured passive target markers 18a-18c placed on the stiffeners 16a-16c and the X, Y, Z values for measured passive target markers 32a-32c placed on the robot base 8 when robot base 8 and half-barrel fuselage section 2 are at their respective initial locations. This is accomplished by aiming the LPS laser beam 28 at each passive target marker in succession while the LPS is in the same location. The LPS computer 48 then uses a relative localization process to produce data representing the position of the end of the stiffener relative to the robot base 8. This methodology can be used at the start of each work sequence to establish the positions of the ends of stiffeners of a first half-barrel fuselage section relative to the positions of the ends of stiffeners of a second (subsequently inspected) half-barrel fuselage section. The pre-programmed motion plan of the robot 10 for inspecting stiffeners can be adjusted based on these position offsets.

Measurement Process Background and Equation Derivation

The process described herein is based on the relative object location process which will be described in more detail later with reference to FIGS. 8-11. Enhancements to that process will now be described that are specific to the calibration and control of robotic manipulators for the inspection of workpieces, such as airplane fuselage sections made of composite material or other large composite structures. The following description focuses on three specific areas associated with this type of inspection application: (1) determining the base offset of the robot relative to the current location of the workpiece; (2) providing specific feature location deviation data to the robot controller; and (3) compensating for differences in origin offsets for the measurement instrument (e.g., LPS) and robot coordinate systems.

In the following discussion, T indicates a 4×4 homogeneous transformation matrix, and letters in curly brackets { }, as well as the leading subscripts and superscripts for the T matrices, identify the coordinate systems (i.e., frames of reference) for each of the elements of the system: the LPS, the workpiece, the robot, and the workcell reference frame used by the robot controller, which are identified by the letters L, B, R, and C, respectively. The prime symbol after a curly bracket indicates the coordinate system has moved relative to an initial location or is displaced relative to the unprimed coordinate system.

Robot Base Offset Correction

Figure 4:
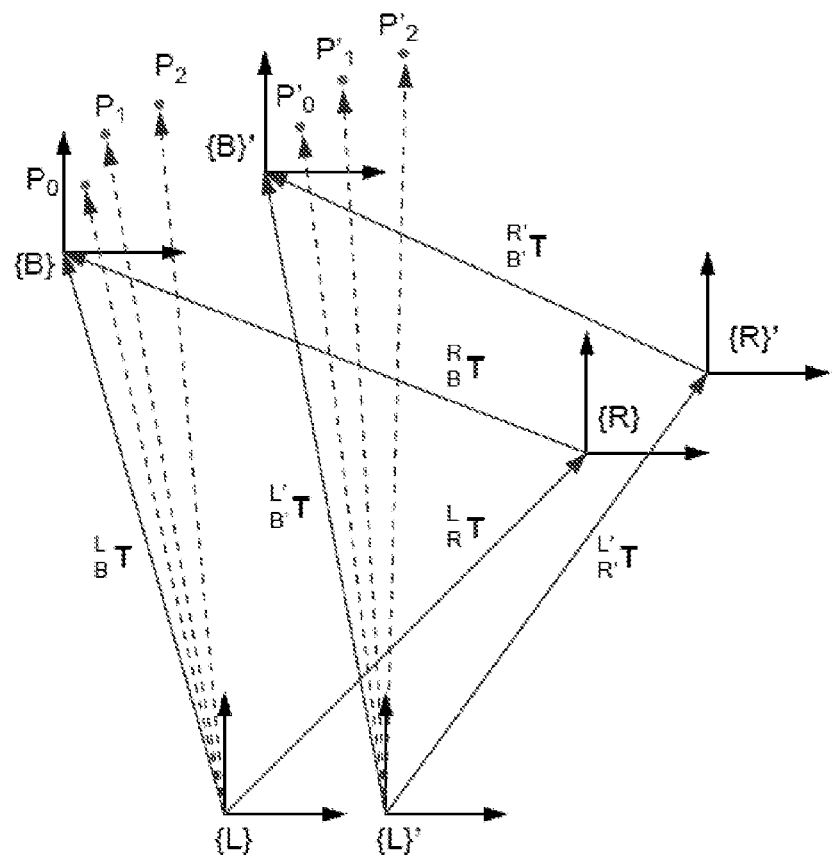
FIG. 4 is a coordinate system vector diagram showing respective locations of coordinate systems for initial and subsequent half-barrel fuselage sections (as measured by the LPS), initial and subsequent locations of a coordinate system for a movable robot base (as measured by the LPS), and initial and subsequent locations of a coordinate system for the LPS (which is also movable). The "subsequent" coordinate system locations are indicated by "prime" symbols.

The robot base offset process enables re-use of an overall motion program developed for a robot by using location feedback associated with the relative locations of a half-barrel fuselage section 2 and a robot base 8. In order to determine the change in the relative position and orientation offset between the initial locations of half-barrel fuselage section 2 and robot base 8 and their respective subsequent locations, the location of the half-barrel fuselage section 2 with respect to the robot reference frame will be needed. This will be denoted as $_B^R T$ for the initial location and $_B^{R'} T$ for the subsequent location(s), as shown in FIG. 4. These matrices will be determined by using the LPS to measure the three calibration points 30a-30c on the half-barrel fuselage section 2 and the three calibration points 32a-32c on the robot base 8 for each moved case using the following equations:

$$_B^R T = (_R^L T)^{-1} {}_B^L T \tag{1}$$

$$_B^{R'} T = (_{R'}^{L'} T)^{-1} {}_B^{L'} T \tag{2}$$

which describe the transformation matrix for the half-barrel fuselage section 2 relative to the coordinate system of the robot base 8 in terms of the inverse of the transformation matrix for the robot base 8 relative to the coordinate system of the LPS 20 multiplied by the transformation matrix for the half-barrel fuselage section 2 relative to the coordinate system of the LPS, for the initial and subsequent locations, respectively. The exact process for determining the transformation matrix from the calibration point data is described in detail later with reference to FIGS. 8 through 11.

Figure 5:
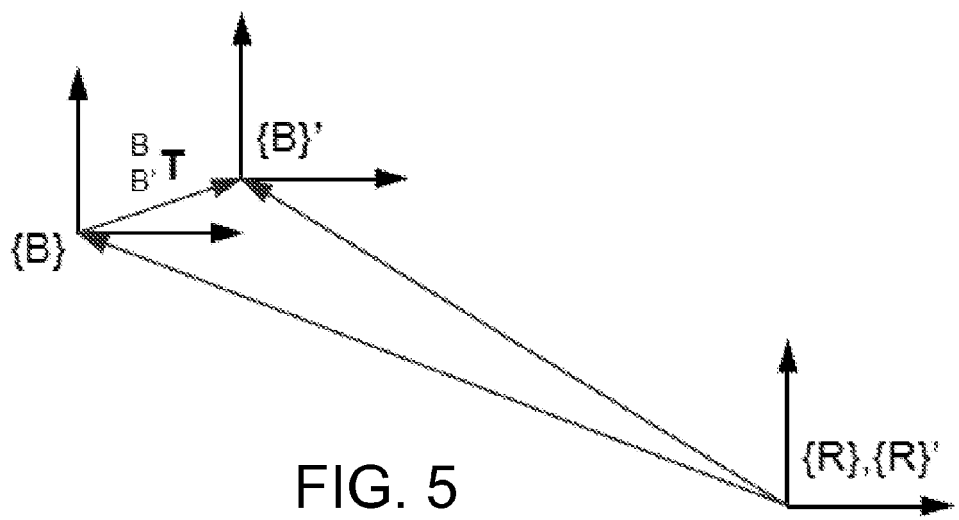
FIG. 5 is a coordinate system vector diagram showing respective locations of coordinate systems for initial and subsequent half-barrel fuselage sections (as measured by the LPS) when the initial and subsequent locations of the coordinate system for the movable robot base (as measured by the LPS) are superimposed on each other.

The robot coordinate system will be used as the frame of reference for the next step, which allows one to consider the coordinate system {R} when the robot base 8 is at the initial location and the coordinate system {R}' when the robot base 8 is at the subsequent location to be the same, as shown in FIG. 5. The subsequent location of the coordinate system {B}' of the half-barrel fuselage section 2 relative to the initial location of the coordinate system {B} of the half-barrel fuselage section 2 (see FIG. 4) can be determined by the following transformation matrix:

$$_{B'}^B T = (_B^R T)^{-1} {}_{B'}^{R'} T \tag{3}$$

In the following discussion, this matrix is renamed as difference matrix $M_{diff}$.

The difference matrix $M_{diff}$ can be sent to the robot controller 80, assuming that the workcell coordinate system used by the LPS 20 is the same as the workcell coordinate system used by the robot controller 80—which is not always the case. As will be explained below with reference to Eqs. (7) and (8) and FIG. 7, the potential for a deviation of the respective workcell coordinate systems of the LPS 20 and robot controller 80 can be accounted for by setting the difference matrix $M_{diff}$ equal to a matrix $_{C'}^C T$ that takes the deviation into account (instead of setting $M_{diff} = {}_{B'}^B T$).

The matrix $M_{diff}$ provided to the robot controller 80 is used to offset the robot controller's definition of the workcell coordinate system. This data may be provided to the robot controller 80 by various means depending on the type of controller, such as though a serial link, through a network socket connection, or even by means of a data file.

The offset difference matrix is used in the robot controller 80 by applying it to an initial offset matrix $M_{init\_offset}$ that was used during the initial programming of the motion path plan. This application of the difference matrix is in the form of the matrix multiplication shown below:

$$M_{new\_offset} = M_{diff} M_{init\_offset} \tag{4}$$

This operation usually takes place on the robot controller 80, but could be performed externally to the controller and the result sent to the controller (depending on how the specific controller is set up).

Feature Location Offsets

Using the methodology described above, the offset of one half-barrel fuselage section to be inspected relative to another half-barrel fuselage section previously inspected can be determined. A feature location offset process can then be employed to determine the offset of a stiffener of the half-barrel fuselage section to be inspected relative to the location of a corresponding stiffener of the half-barrel fuselage section previously inspected. This feature location offset capability allows for the modification of a sub-section of a stiffener inspection motion plan program based on feedback of specific coordinate locations within the half-barrel fuselage section to be inspected.

Adopting the nomenclature that the position of one end of the i-th stiffener is identified by the variable $P_i$, the positions of end features of stiffeners can be represented by the variables $P_0$, $P_1$, $P_2$, . . . $P_i$, respectively. In accordance with some embodiments, the LPS can be used to determine the offset of an i-th stiffener from one half-barrel fuselage section relative to the corresponding i-th stiffener of another half-barrel fuselage section (e.g., $P_0$ of one fuselage section relative to $P_0'$ of the other fuselage section, $P_1$ relative to $P_1'$, etc. as seen in FIG. 4). For this IML stiffener scanning application, the positions P of the ends of the stiffeners of each subsequent half-barrel fuselage section relative to the positions of the ends of the stiffeners on the initial half-barrel fuselage section are needed.

Starting with the location of the half-barrel fuselage section relative to the LPS, for both the initial and subsequent locations, the change in position P for each of the feature points (i) on the stiffener can be found using the following equation:

$$\Delta \vec{P}_i = (_B{}^L T)^{-1} \vec{P}_i - (_B{}^L T)^{-1} \vec{P}_i' \qquad (5)$$

where the vectors $\vec{P}_i$ and $\vec{P}_i'$ are defined locations on the respective stiffeners of the respective half-barrel fuselage sections relative to the coordinate system of the LPS (and $\Delta \vec{P}_i$ is in the barrel coordinate system {B}).

FIG. 4 shows an example of a coordinate system diagram where initially a LPS having a coordinate system {L} is used to locate a first half-barrel fuselage section (having a coordinate system {B}) relative to a robot (having a coordinate system {R}) and is then used to locate target markers attached to respective stiffeners of the first half-barrel fuselage section at points $P_0$, $P_1$ and $P_2$. Following movement of the LPS to a new location, the same or a different LPS having a coordinate system {L}' is used to locate a second half-barrel fuselage section (having a coordinate system {B}') relative to the same or a different robot (having a coordinate system {R}') and is then used to locate target markers attached to respective stiffeners of the second half-barrel fuselage section at points $P_0'$, $P_1'$ and $P^{2\prime}$. For the purpose of illustration, it is assumed that the same LPS is moved. By superimposing the coordinate systems {L} and {L}', the offset $\Delta \vec{P}_0$ of the position of point $P_0'$ relative to the position of point $P_0$ can be determined and then used to modify a sub-section of the stiffener inspection motion plan program (already loaded in the robot controller) for inspecting the stiffener on which point $P_0$ is located. This modified sub-section of the stiffener inspection motion plan program can then be used to inspect the stiffener on which point $P_0'$ is located.

Once a target marker on a first stiffener of a half-barrel fuselage section has been accurately located, the offset of a target marker on a second stiffener of the same half-barrel fuselage section relative to the location of the target marker on the first stiffener can be determined. Respective target markers attached to the other ends of the first and second stiffeners can also be located and their offset can be determined in a similar manner. In cases where the offsets indicates that the location of the second stiffener deviates from the location expected by the stiffener inspection motion plan program currently loaded in the robot controller, a sub-section of that program can be modified to take that deviation into account.

In accordance with one embodiment, a method for performing an automated function on a stiffener of a workpiece comprises: (a) placing a workpiece having a stiffener in a workcell at a first location while a robot base of a robot is situated at a second location; (b) loading a motion plan program into a robot controller of the robot, the motion plan program being written to control the robot so that an end effector of the robot will: (i) move along a first motion path that is based on an expected position in a coordinate system of the workcell of a point on a stiffener of a workpiece having a structure similar to the workpiece at the first location; and (ii) perform an automated function on the stiffener while the end effector is at a specified position along the first motion path; (c) placing a positioning system so that a laser and a camera of the positioning system have non-occluded views of a plurality of target markers on the workpiece, a plurality of target markers on the robot base, and a target marker at the point on the stiffener; (d) using the positioning system to separately measure respective positions of the plurality of target markers on the workpiece, the plurality of target markers on the robot base, and the target marker at the point on the stiffener; (e) calculating an offset of a position of the point on the stiffener of the workpiece at the first location relative to the expected position based on position information acquired in process (d); (f) modifying the motion plan program for moving the end effector of the robot along a second motion path different than the first motion path based at least in part on the calculated offset; and (g) controlling the robot so that the end effector moves along the second motion path and performs an automated function on the workpiece while the end effector is at a specified position along the second motion path.

Figure 6:
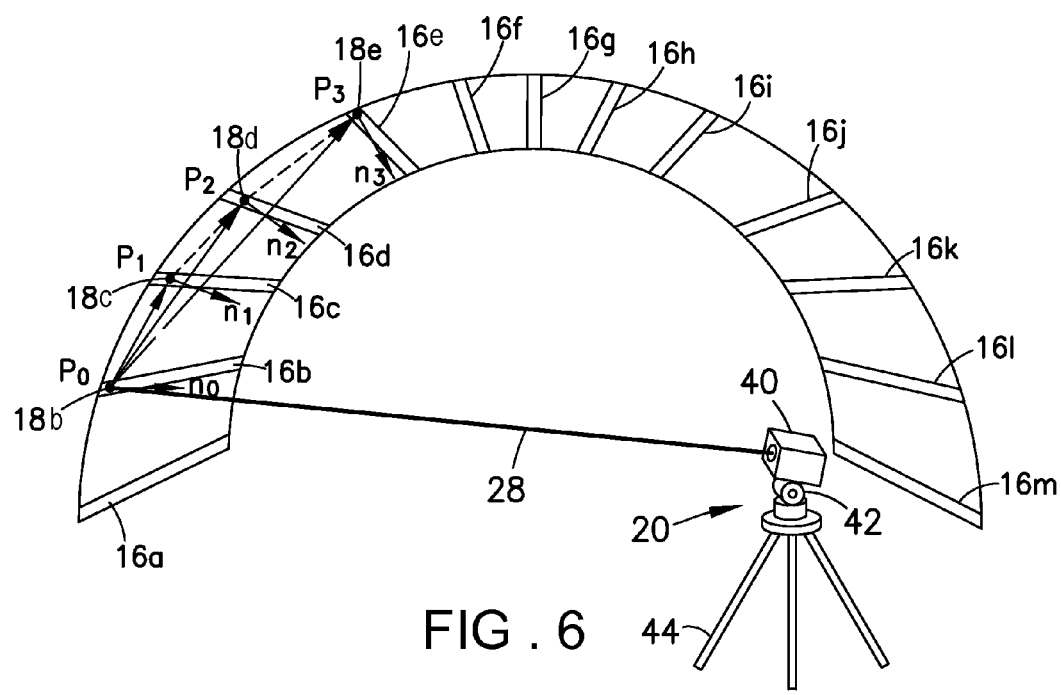
FIG. 6 is a diagram representing aspects of a process for measuring the relative offsets of stiffeners of a half-barrel fuselage section using a LPS in accordance with the embodiment depicted in FIG. 3.

In accordance with other embodiments, the LPS can be used to determine the offsets of a first stiffener relative to other stiffeners (e.g., $P_0$ to $P_1$, $P_0$ to $P_2$, etc. as shown in FIG. 6) on the same half-barrel fuselage section. For this situation, this offset data, along with surface normal data, can be used to allow use of a modified stiffener inspection motion path plan from one stiffener to the next.

Again using the nomenclature that the position of one end of the i-th stiffener is identified by the variable $P_i$, the positions of the end features of stiffeners 16b-16e (having passive target markers 18b-18e respectively affixed thereto) can be represented by the variables $P_0$, $P_1$, $P_2$, and $P_3$ respectively. FIG. 6 shows aspects of a process for measuring stiffeners of a half-barrel fuselage section 2 using an LPS 20 in accordance with the embodiment depicted in FIG. 3. Although not shown in FIG. 6, it should be understood that the locations of stiffeners 16a-16m will depend on the shape of the fuselage section. For example, in some implementations the fuselage section being inspected may have a cylindrical or conical shape, in which cases the stiffeners may be circumferentially distributed, each stiffener extending from one end of the fuselage section to the other end.

In accordance with one embodiment, a method for performing an automated function on stiffeners of a workpiece comprises: (a) placing a workpiece having a plurality of stiffeners in a workcell at a first location while a robot base of a robot is situated at a second location; (b) loading a motion plan program into a robot controller of the robot, the motion plan program being written to control the robot so that an end effector of the robot will: (i) move along a first motion path adjacent a first stiffener that is based on an expected position in a coordinate system of the workcell of a point on the first stiffener of the workpiece; and (ii) perform an automated function on the first stiffener while the end effector is at a specified position along the first motion path; (c) placing a positioning system so that a laser and a camera of the positioning system have non-occluded views of respective target markers at respective points on the first stiffener and second and third stiffeners of the workpiece; (d) using the positioning system to measure a position of the target marker on a second stiffener; (e) calculating an offset of the position of the point on the second stiffener relative to the expected position of the point on the first stiffener based on position information acquired in process (d); (f) modifying the motion plan program for moving the end effector of the robot along a second motion path adjacent the second stiffener based at least in part on the calculated offset; and (g) controlling the robot so that the end effector moves along the second motion path and performs an automated function on the second stiffener while the end effector is at a specified position along the second motion path.

In addition to the relative positions of the ends of the stiffeners, the surface normal for each of the stiffeners may also be needed (shown as the $n_i$ vectors in FIG. 6) for the alignment of the NDI scan head. An approximation of the surface normal at each position $P_i$ can be found using the surrounding points, for example:

$$\vec{n}_i = \hat{x} \times (\vec{P}_{i+1} - \vec{P}_{i-1}) \quad (6)$$

where $\hat{x}$ is the unit vector in the X-direction (i.e., parallel to the axis) of the half-barrel fuselage section.

Variation in Workcell Origin Definition

In the earlier discussion involving the computation of the robot base offset, it was assumed that the definitions of the origins of the respective workcell coordinate systems used by the LPS and the robot controller 80 were in the same location, but in practical applications this may not be the case. The two applications may have different definitions of where the workcell origin is located, in which case it will be necessary to modify the results computed by the LPS 20 to transform them into the workcell reference frame expected by the robot controller 80. The following discussion addresses this situation.

Figure 7:
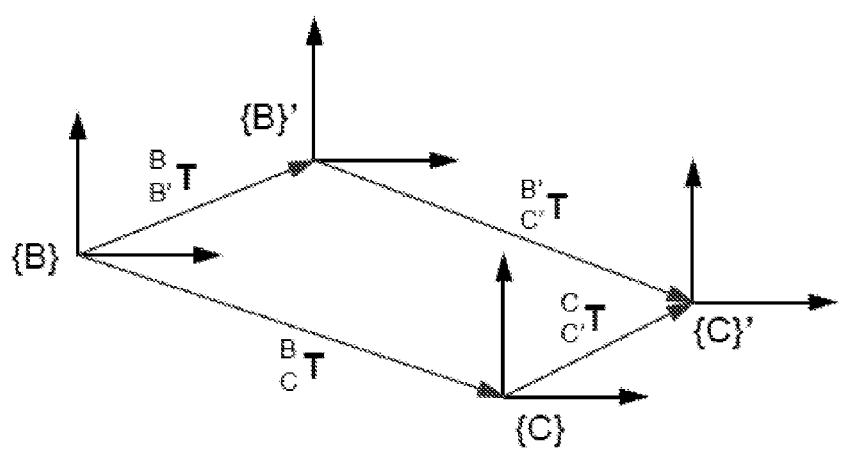
FIG. 7 is a coordinate system vector diagram showing respective locations of coordinate systems {B} and {B}' for initial and subsequent half-barrel fuselage sections as measured by the LPS and respective locations of coordinate systems {C} and {C}' for the workcell as initially defined in a robot controller and as subsequently modified in the robot controller by means of an origin correction computation.

FIG. 7 is a coordinate system vector diagram showing respective locations of coordinate systems {B} and {B}' for initial and subsequent half-barrel fuselage sections as measured by the LPS and respective locations of coordinate systems {C} and {C}' for the workcell as initially defined in the robot controller and as subsequently modified in the robot controller by means of an origin correction computation.

Starting with the configuration shown in the vector diagram of FIG. 7, where a half-barrel fuselage section has moved from the initial location to a second location (or where first and second half-barrel fuselage sections has been respectively located at first and second times), the LPS and robot controller have different locations defined for the origin of the half-barrel fuselage section, shown as {B} and {B}', {C} and {C}', respectively. The LPS computer calculates the offset of the half-barrel fuselage section from its initial location to a subsequent location in terms of the origin of the half-barrel fuselage section coordinate system that it has defined, but this can be converted into the coordinate system that the robot controller has for the half-barrel fuselage section by using the following equation:

$$_{C'}^{C}T = (_C^B T)^{-1} {}_{B'}^B T {}_{C'}^{B'} T \quad (7)$$

Where the origin offset difference between the two workcell coordinate systems stays constant for the duration of this application:

$$_C^B T = _{C'}^{B'} T \quad (8)$$

As previously mentioned, coordinate system {C} refers to the workcell reference frame used by the robot controller 80. This may or may not be the same as the workcell reference frame that is used by the LPS to define the coordinates of the origin of the half-barrel fuselage section coordinate system {B}. Equations (7) and (8) provide the robot base offset when the workcell reference frames used by the LPS and the robot controller 80 are not the same. To adjust for this workcell coordinate system offset, $M_{diff}$ is set equal to the matrix from Eq. (7) (instead of the resulting matrix from Eq. (3)). Matrix $M_{diff}$ is provided to the robot controller 80, which uses it to offset the robot controller's definition of the workcell coordinate system.

The method described here uses location feedback to correct an existing robot program, either in a macroscopic way using the base offset change (which affects the entire program) or by making localized changes to a sub-section of the program using feature offset data. The low-cost, rapid process for calibrating robot orientation to the part orientation disclosed herein has the capability to increase the rate of inspection/NDI for composite parts.

Process for Measuring Location Offsets for Multiple Moving Objects

The process described in U.S. patent application Ser. No. 14/222,368 can be used to measure the location offset between multiple sets of moved points. This method for determining location displacement enables the determination of the position and orientation of one target object relative to another using only a single, portable measurement device and visible reference features on the target objects. This approach will enable additional types of relative displacement use cases in situations with two or more moved objects (each with its own set of visible reference points arranged in the same configuration).

Figure 8:
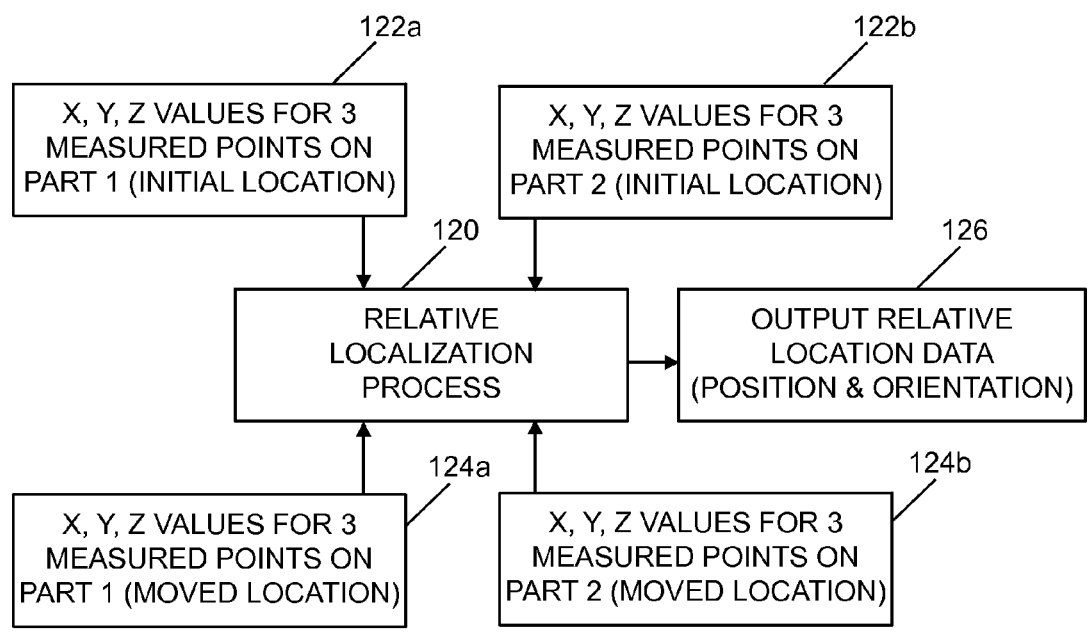
FIG. 8 is a flowchart showing data acquisition and processing steps in a method of measuring location offset for multiple moving objects.

FIG. 8 shows steps of a method in accordance with one embodiment for measuring the location offset between two workpieces (e.g., Part 1 and Part 2) when either or both parts have moved relative to an LPS instrument. First, the system determines the X, Y, Z values for three measured points on Part 1 and the X, Y, Z values for three measured points on Part 2 when these parts are at their respective initial locations (steps 122*a* and 122*b*). The three measured points on Parts 1 and 2 may be arranged in the same or different configurations, so long as the three reference points in each set are not collinear. After Parts 1 and 2 are moved to new locations, again the system determines the X, Y, Z values for the same measured points on Parts 1 and 2 (steps 124*a* and 124*b*). All of these values are input into a relative localization process 120 which processes the X, Y, Z values for the respective initial and moved locations of Parts 1 and 2, and then outputs relative location data (step 126).

The foregoing variation of the method for determining location displacement can be used to compute the location change of one or more objects from a reference object, even if the location of the LPS instrument has changed. This capability can be used to address situations where two or more independent objects may move relative to each other, and where one or more of them may have moved relative to the location of a respective LPS instrument. Since this form of the method is addressing relative displacement between the two (or more) objects, the process is independent of LPS instrument location change.

And if it is known that the location of the LPS instrument has not changed, or if the location offset of the LPS instrument from its initial location is known, then the location of all of the moved objects relative to the reference object in its initial location can be determined.

In a scenario wherein two objects have moved, the LPS instrument has moved, and one stationary object is available, the relative displacement of the moved objects can be determined with respect to the location of one of the objects in its initial position.

An example of this type of use case is a robotic workcell where the displacement of the robot relative to a workpiece is required, but the workpiece, the robot, and the LPS instrument may have all been moved from prior locations when the robot was initially programmed. For example, the techniques disclosed above can be used to determine the position and orientation of a robotic arm relative to a workpiece (hereinafter "part") in such a situation.

Figure 9:
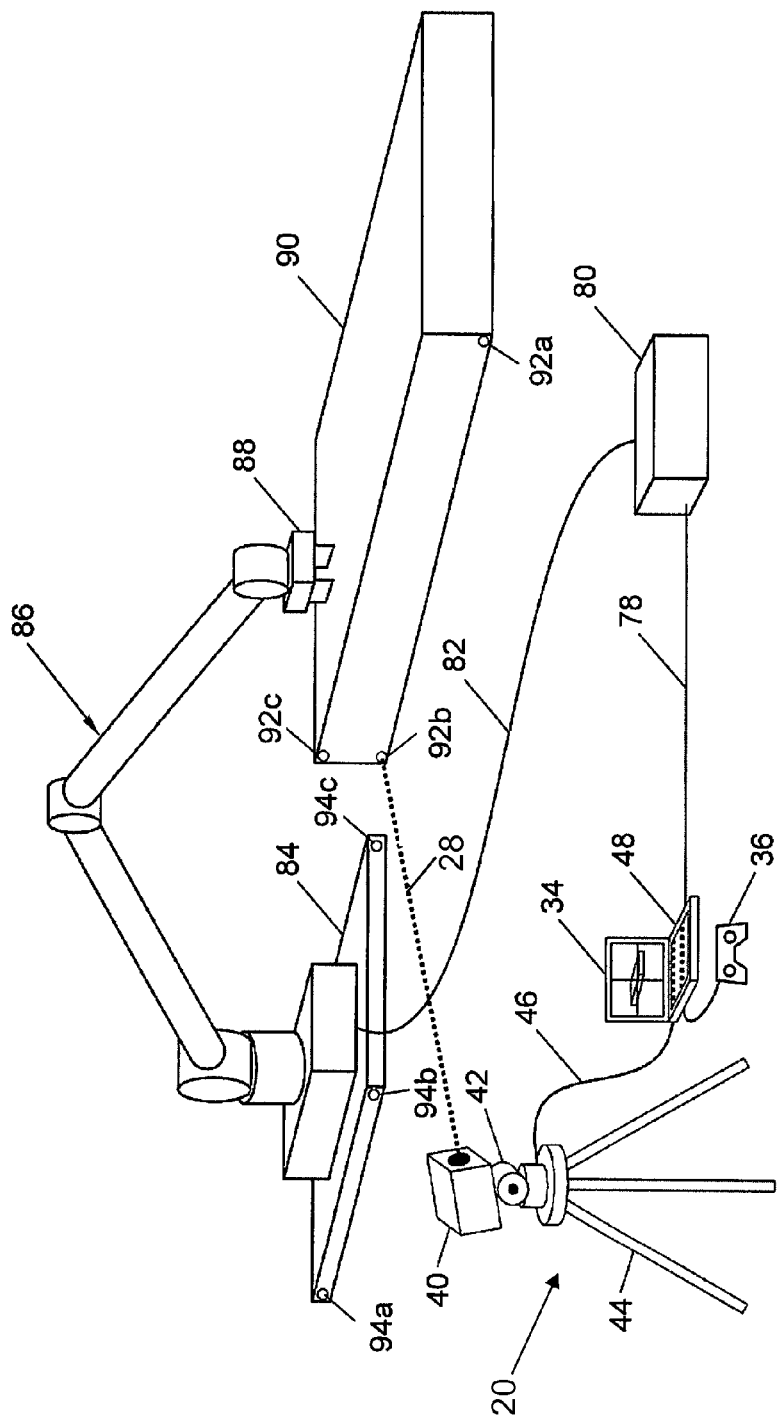
FIG. 9 is a diagram showing an isometric view of a physical setup in which a LPS is aimed at a robotic workcell with multiple moving objects in accordance with another embodiment.

As shown in FIG. 9, the LPS 20 comprises the same components previously described with reference to FIG. 1. The LPS 20 seen in FIG. 9 can be used to determine the relative offset between a part 90 and the robot base 84 of a robotic arm 86 that may carry an end effector 88 on a distal end thereof. The robot controller 80 controls the robotic arm 86 and operates the end effector 88 for performing inspection, machining or other operations on the part 90. The LPS computer 48 communicates with the robot controller 80 through a cable 78. The robot controller 80 is preferably a computer programmed with motion control software whereby the location of end effector 88 can be controlled as a function of object location data output by the LPS computer 48.

The location offset between robot base 84 and part 90 can be determined in the manner previously described with reference to FIG. 1. First, the LPS computer 48 determines the X, Y, Z values for measured points 92a-92c on part 90 and the X, Y, Z values for measured points 94a-94c on robot base 84 when robot base 84 and part 90 are at their respective initial locations. After robot base 84 and part 90 have moved to new locations, again LPS is used to determine the X, Y, Z values for measured points 92a-92c and 94a-94c. The LPS computer 48 then uses a relative localization process to produce data representing the location of the part 90 relative to the robot base 84 at their new locations. This data is output to the robot controller 80 via cable 78.

The foregoing methodology can be used at the start of each work sequence to establish the relative positions of the robot base 84 and the part 90. The robot controller 80 will be able to compute the position and orientation of the end effector 88 relative to the robot base 84 (using other sensors and kinematics data).

Figure 10:
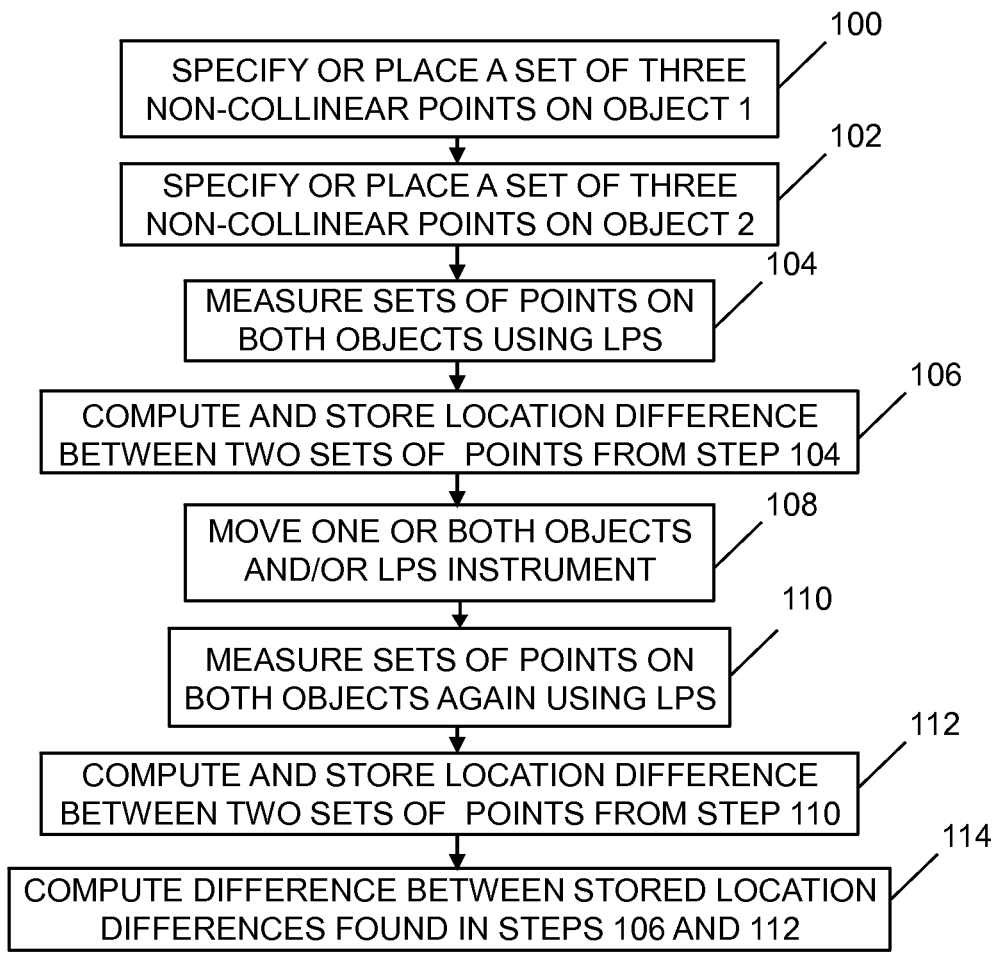
FIG. 10 is a flowchart showing steps of a process for measuring location offsets for multiple moving objects.

The steps of a method of measuring the location offset or difference between two moving objects (such as the robot base 84 and the part 90 depicted in FIG. 9) are outlined in FIG. 10. First, a set of three non-collinear points on a first target object (Object 1 in FIG. 10) is specified or a set of markers are attached to the first target object at a set of three non-collinear points (step 100); and then a set of three non-collinear points on a second target object (Object 2 in FIG. 10) is specified or a set of markers are attached to the second target object at a set of three non-collinear points (step 102). Then the coordinates of the three non-collinear points on both objects are measured using the LPS instrument (step 104). (The respective frames of reference of the LPS instrument and the first and second target objects are indicated by {0}, {1}, and {2} in FIG. 11.) The measurement results are stored in memory. The LPS computer 48 (see FIG. 9) then computes the location difference between the two sets of points (step 106) based on the measurement results in step 104, defined in the reference frame of one of the objects (as described above), and stores this location difference in memory (e.g., as a 4×4 transformation matrix).

Figure 11:
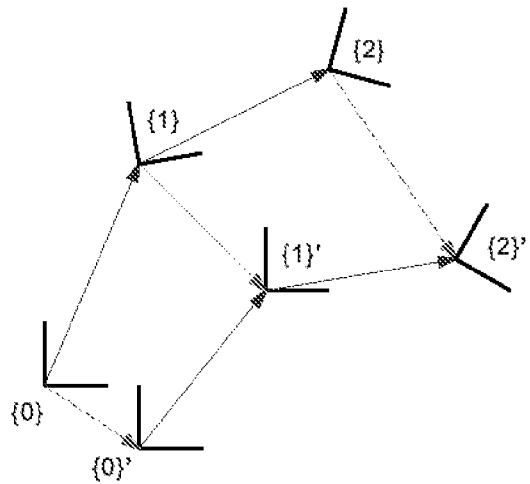
FIG. 11 is a diagram showing example reference frame configurations for multiple moving objects.

Following this first set of measurements, one or both of the objects and/or the LPS instrument can be moved (step 108). FIG. 11 depicts a situation wherein all three have been moved, the LPS instrument moving from reference frame {0} to reference frame {0}', Object 1 moving from reference frame {1} to reference frame {1}', and Object 2 moving from reference frame {2} to reference frame {2}.

After the objects and LPS are moved, the coordinates of the same points on Objects 1 and 2 are measured again with respect to frames of reference {1}' and {2}' using the LPS instrument (see step 110 in FIG. 10). Again the measurement results are stored in memory. The LPS computer then computes the location difference between the two new sets of points (step 112) based on the measurement results in step 110 (defined in the reference frame of the same object that was selected in step 106), and stores this location difference in memory (e.g., as another 4×4 transformation matrix). Then the LPS computer computes the difference between the stored location differences found in steps 106 and 112.

In the robotic workcell example described above with reference to FIG. 9, the location differences found in step 114 above would be used by the robot controller 80 to determine its new base offset value of the robot relative to the workpiece. In this situation, the LPS instrument would be represented by reference frames {1} and {1}', the robot by reference frames {2} and {2}', and the workpiece by reference frames {3} and {3}' (as shown in FIG. 11). To determine the required change for the robot base offset value, reference frames {2} and {2}' can be considered to be coincident. This allows the calculated difference between workpiece locations {3} and {3}' to be applied to the robot base offset in the current location of the robot {2}'.

In the manual operation mode the user directs the LPS instrument to aim at the visible calibration features on the target object, but if active target markers, such as LEDs, are placed on the target object (as disclosed in U.S. patent application Ser. No. 13/921,246), then the measurement procedure can be automated. This works by using images from the LPS camera and an image processing differencing method to detect the active markers (LEDs) on the target. These marker locations will then be used to direct the LPS instrument to aim at the markers to acquire distance information for the required number of points (three) for use with the location difference method disclosed herein. With the use of active markers, the location difference method can be performed by a fully automated system.

Figure 12:
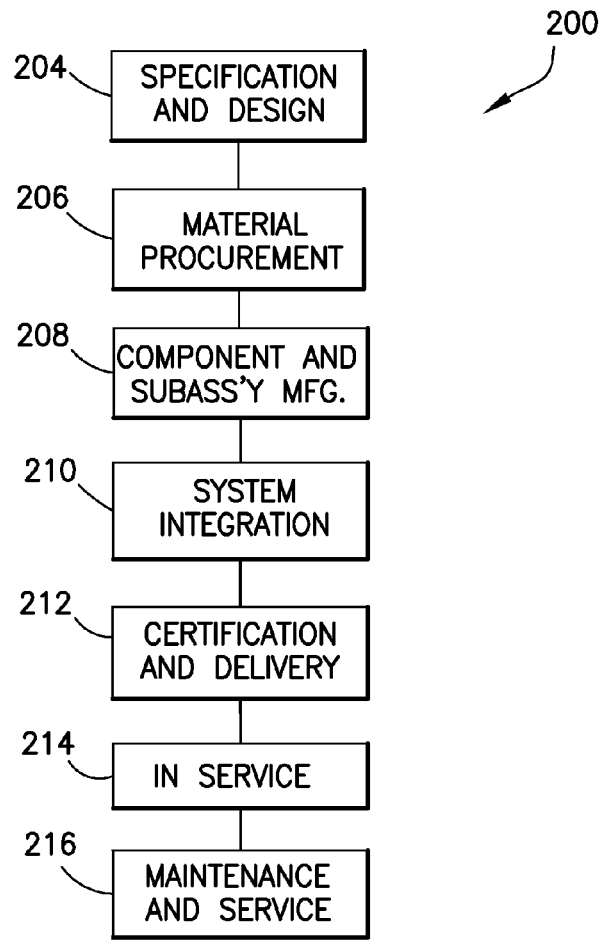
FIG. 12 is a flow diagram of an aircraft production and service methodology.
Figure 13:
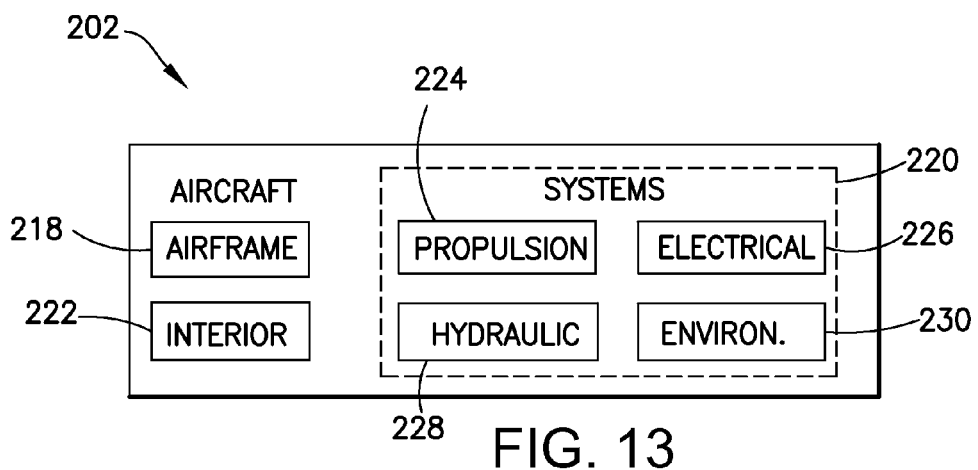
FIG. 13 is a block diagram showing systems of an aircraft.

The systems and methods disclosed above may be employed in an aircraft manufacturing and service method 200 as shown in FIG. 12 for inspecting parts of an aircraft 202 as shown in FIG. 13. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 202 produced by exemplary method 200 may include an airframe 218 (comprising, e.g., a fuselage, frames, stiffeners, wing boxes, etc.) with a plurality of systems 220 and an interior 222. Examples of high-level systems 220 include one or more of the following: a propulsion system 224, an electrical system 226, a hydraulic system 228, and an environmental control system 230. Any number of other systems may be included. Although an aerospace example is shown, the principles disclosed herein may be applied to other industries, such as the automotive industry.

Apparatus and methods embodied herein may be employed during one or more of the stages of exemplary method 200 shown in FIG. 12. For example, components or subassemblies fabricated or assembled during production process 208 may be inspected using the inspection system disclosed herein. Also, one or more apparatus embodiments, method embodiments, or a combination thereof may be utilized during the production stages 208 and 210, for example, by substantially expediting assembly of or reducing the cost of an aircraft 202.

While calibration processes have been described with reference to various embodiments, it will be understood by those skilled in the art that various changes may be made and equivalents may be substituted for elements thereof without departing from the scope of the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

As used in the claims, the term "location" comprises position in a fixed three-dimensional coordinate system and orientation relative to that coordinate system.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for performing an automated function on a workpiece, said method comprising:
 (a) loading a motion plan program into a robot controller of a robot, the motion plan program being written to control the robot so that an end effector of the robot will: (i) move along a first motion path while a first workpiece is situated at a first location in a workcell and a robot base of the robot is situated at a second location such that the first workpiece has a first offset relative to the robot base; and (ii) perform an automated function on the first workpiece while the end effector is at a specified location along the first motion path;
 (b) placing a second workpiece in the workcell at a third location while the robot base of the robot is situated at a fourth location;
 (c) placing a positioning system a fifth location so that a laser and a camera of the positioning system have non-occluded views of a plurality of target markers on the second workpiece and a plurality of target markers on the robot base;
 (d) using the positioning system to separately measure respective positions of the plurality of target markers on the second workpiece and the plurality of target markers on the robot base;
 (e) calculating a second offset of the second workpiece at the third location relative to the robot base at the fourth location based on position information acquired in process (d);
 (f) modifying the motion plan program for moving the end effector of the robot along a second motion path different than the first motion path based at least in part on a difference between the first and second offsets; and
 (g) controlling the robot so that the end effector moves along the second motion path while the second workpiece is situated at the third location and performs an automated function on the second workpiece while the end effector is at a specified location along the second motion path.

2. The method as recited in claim 1, wherein each plurality of target markers comprises first, second and third target markers which are not collinear.

3. The method as recited in claim 1, wherein the automated function is non-destructive inspection.

4. The method as recited in claim 1, wherein the first and second workpieces are fuselage sections made of composite material.

5. The method as recited in claim 1, wherein the modification to the motion plan program compensates for a difference in a location of an origin of a coordinate system of the workcell as defined with reference to a coordinate system of the positioning system and the location of the origin of the coordinate system of the workcell as defined with reference to a coordinate system of the robot base.

6. A method for performing an automated function on successive workpieces, said method comprising:
 (a) placing a first workpiece in a workcell at a first location while a robot base of a robot is situated at a second location;
 (b) placing a positioning system at a third location so that a laser and a camera of the positioning system have non-occluded views of a plurality of target markers on the first workpiece and a plurality of target markers on the robot base;
 (c) using the positioning system to separately measure respective positions of the target markers on the first workpiece and the target markers on the robot base;
 (d) calculating a first offset of the first workpiece at the first location relative to the robot base at the second location based on position information acquired in process (c);

(e) creating a motion plan program for moving an end effector of the robot along a first motion path, the motion plan program being based at least in part on the first offset;

(f) loading the motion plan program into a robot controller of the robot;

(g) controlling the robot so that the end effector moves along the first motion path while the first workpiece is situated at the first location and performs an automated function on the first workpiece while the end effector is at a specified location along the first motion path;

(h) removing the first workpiece from the workcell after process (g);

(i) placing a second workpiece at a fourth location in the workcell after the first workpiece has been removed and while the robot base is situated at a fifth location in the workcell;

(j) placing the positioning system at a sixth location so that the laser and the camera of the positioning system have non-occluded views of a plurality of target markers on the second workpiece and the plurality of target markers on the robot base, wherein the sixth location may be the same or different than the third location;

(k) using the positioning system to separately measure respective positions of the plurality of target markers on the second workpiece and the plurality of target markers on the robot base;

(l) calculating a second offset of the second workpiece at the fourth location relative to the robot base at the fifth location based on position information acquired in process (k);

(m) modifying the motion plan program for moving the end effector of the robot along a second motion path different than the first motion path based at least in part on a difference between the first and second offsets; and (n) controlling the robot so that the end effector moves along the second motion path while the second workpiece is situated at the fourth location and performs an automated function on the second workpiece while the end effector is at a specified location along the second motion path.

7. The method as recited in claim 6, wherein each plurality of target markers comprises first, second and third target markers which are not collinear.

8. The method as recited in claim 6, wherein the automated function is non-destructive inspection.

9. The method as recited in claim 6, wherein the first and second workpieces are fuselage sections made of composite material.

10. The method as recited in claim 6, wherein the modification to the motion plan program compensates for a difference in a location of an origin of a coordinate system of the workcell as defined with reference to a coordinate system of the positioning system and the location of the origin of the coordinate system of the workcell as defined with reference to a coordinate system of the robot base.

11. The method as recited in claim 6, wherein step (d) comprises determining a first transformation matrix representing the first location of the first workpiece with respect to a coordinate system of the robot base in the second location, and step (k) comprises determining a second transformation matrix representing the fourth location of the second workpiece with respect to the coordinate system of the robot base in the fifth location, said method further comprising determining a third transformation matrix which is a product of the second transformation matrix and an inverse of the first transformation matrix, wherein the third transformation matrix represents the difference between the first and second offsets.

12. The method as recited in claim 6, wherein step (d) comprises determining a first transformation matrix representing the first location of the first workpiece with respect to a coordinate system of the positioning system, and step (k) comprises determining a second transformation matrix representing the fourth location of the second workpiece with respect to the coordinate system of the positioning system.

13. The method as recited in claim 12, further comprising:
using the positioning system to determine a position of a target marker on a component of the first workpiece relative to the coordinate system of the positioning system when the first workpiece is at the first location;
using the positioning system to determine a position of a target marker on a component of the second workpiece relative to the coordinate system of the positioning system when the second workpiece is at the fourth location; and
determining a difference in the positions of the target markers attached to the respective components of the first and second workpieces.

14. The method as recited in claim 13, further comprising:
modifying a portion of the motion plan program to take into account the difference in the positions of the target markers on the respective components of the first and second workpieces in their respective locations; and
controlling the robot so that the end effector moves along a path segment that deviates from the second motion path while the second workpiece is situated at the third location and performs an automated function on the component of the second workpiece while the end effector is at a specified position along the path segment.

15. The method as recited in claim 14, wherein the automated function is non-destructive inspection.

16. The method as recited in claim 13, wherein the first and second workpieces are fuselage sections made of composite material and the components are stiffeners.

17. A method for performing an automated function on a stiffener of a workpiece, said method comprising:

(a) placing a workpiece having a stiffener in a workcell at a first location while a robot base of a robot is situated at a second location;

(b) loading a motion plan program into a robot controller of the robot, the motion plan program being written to control the robot so that an end effector of the robot will: (i) move along a first motion path that is based on an expected position in a coordinate system of the workcell of a point on a stiffener of a workpiece having a structure similar to the workpiece at the first location; and (ii) perform an automated function on the stiffener while the end effector is at a specified location along the first motion path;

(c) placing a positioning system at a third location so that a laser and a camera of the positioning system have non-occluded views of a plurality of target markers on the workpiece, a plurality of target markers on the robot base, and a target marker at the point on the stiffener;

(d) using the positioning system to separately measure respective positions of the plurality of target markers on the workpiece, the plurality of target markers on the robot base, and the target marker at the point on the stiffener;

(e) calculating an offset of a position of the point on the stiffener of the workpiece at the first location relative to the expected position based on position information acquired in process (d);

(f) modifying the motion plan program for moving the end effector of the robot along a second motion path that is different than the first motion path based at least in part on the calculated offset; and (g) controlling the robot so that the end effector moves along the second motion path and performs an automated function on the workpiece while the end effector is at a specified location along the second motion path.

18. The method as recited in claim 17, wherein the automated function is non-destructive inspection and the workpiece is a fuselage section made of composite material.

19. A method for performing an automated function on stiffeners of a workpiece, said method comprising:

(a) placing a workpiece having at least first, second and third stiffeners in a workcell at a first location while a robot base of a robot is situated at a second location, the second stiffener being between the first and third stiffeners;

(b) loading a motion plan program into a robot controller of the robot, the motion plan program being written to control the robot so that an end effector of the robot will: (i) move along a first motion path adjacent to the first stiffener of the workpiece that is based on an expected position in a coordinate system of the workcell of a point on the first stiffener; and (ii) perform an automated function on the first stiffener while the end effector is at a specified location along the first motion path;

(c) placing a positioning system at a third location so that a laser and a camera of the positioning system have non-occluded views of respective target markers at respective points on the first, second and third stiffeners of the workpiece;

(d) using the positioning system to measure a position of the target marker on the second stiffener;

(e) calculating an offset of the position of the point on the second stiffener relative to the expected position of the point on the first stiffener based on position information acquired in process (d);

(f) modifying the motion plan program for moving the end effector of the robot along a second motion path adjacent the second stiffener based at least in part on the calculated offset; and (g) controlling the robot so that the end effector moves along the second motion path and performs an automated function on the second stiffener while the end effector is at a specified location along the second motion path.

20. The method as recited in claim 19, further comprising:

using the positioning system to measure respective positions of the target markers on the first and third stiffeners; and determining a direction of a vector normal to the target marker on the second stiffener based on the measured respective positions of the target markers on the first and third stiffeners.

* * * * *